(12) United States Patent
Sazai et al.

(10) Patent No.: US 11,543,674 B2
(45) Date of Patent: Jan. 3, 2023

(54) OPTICAL UNIT WITH IMAGE STABILIZATION FUNCTION

(71) Applicant: NIDEC CORPORATION, Kyoto (JP)

(72) Inventors: Kazuhiro Sazai, Kyoto (JP); Tsutomu Arai, Nagano (JP); Tomohiro Egawa, Kyoto (JP); Shinji Minamisawa, Nagano (JP); Takayuki Iwase, Kyoto (JP); Takeshi Sue, Nagano (JP); Genki Tanaka, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/160,375

(22) Filed: Jan. 28, 2021

(65) Prior Publication Data

US 2021/0240002 A1    Aug. 5, 2021

(30) Foreign Application Priority Data

Jan. 30, 2020    (JP) .............................. JP2020-013456

(51) Int. Cl.
*G02B 27/64* (2006.01)
*G03B 5/00* (2021.01)

(52) U.S. Cl.
CPC ............. *G02B 27/646* (2013.01); *G03B 5/00* (2013.01)

(58) Field of Classification Search
None
See application file for complete search history.

(56) References Cited

U.S. PATENT DOCUMENTS

| 2006/0055787 | A1* | 3/2006 | Hirota | H04N 5/2253 |
| | | | | 348/208.5 |
| 2015/0195460 | A1* | 7/2015 | Yasuda | H04N 5/23287 |
| | | | | 359/557 |
| 2016/0109681 | A1* | 4/2016 | Lam | G02B 7/09 |
| | | | | 359/824 |
| 2016/0299312 | A1* | 10/2016 | Cho | H02K 41/0356 |
| 2017/0280036 | A1* | 9/2017 | Morinaga | H04N 5/2257 |
| 2021/0318592 | A1* | 10/2021 | Kim | G02B 7/08 |
| 2022/0221734 | A1* | 7/2022 | Kim | G03B 5/00 |

FOREIGN PATENT DOCUMENTS

JP        2017116861 A    6/2017

* cited by examiner

*Primary Examiner* — Derek S. Chapel
(74) *Attorney, Agent, or Firm* — Hauptman Ham, LLP (57) ABSTRACT

An optical unit with an image stabilization function includes a movable body having an annular holder for holding a camera module, a swing support mechanism for swingably supporting the movable body, and a fixing body for supporting the movable body with the swing support mechanism interposed between them. The holder includes three or more of a plurality of protrusions that project radially. The fixing body includes a plurality of arc surfaces that come into contact with each of the plurality of protrusions from the outer peripheral side. The swing support mechanism includes the plurality of protrusions and the plurality of arc surfaces. The arc surface is a concave curved surface obtained by transferring part of a virtual spherical surface centered on a preset swing center point.

9 Claims, 7 Drawing Sheets

OPTICAL UNIT WITH IMAGE STABILIZATION FUNCTION

CROSS-REFERENCE TO RELATED APPLICATIONS

The present invention claims priority under 35 U.S.C. § 119 to Japanese Patent Application No. 2020-013456 filed on Jan. 30, 2020, the entire content of which is incorporated herein by reference.

FIELD OF THE INVENTION

The present disclosure relates to an optical unit with an image stabilization function that corrects shake of an optical unit.

BACKGROUND

Some optical units mounted on a mobile terminal or a moving body have a mechanism for correcting the shake by swinging or rotating a movable body provided with a lens in order to suppress distortion of a captured image when the mobile terminal or the moving body moves.

Many conventional optical units with an image stabilization function include a movable body that includes a camera module including a lens and an image sensor, a support mechanism that swingably supports the movable body in a direction intersecting an optical axis, a fixing body that supports the movable body with the support mechanism interposed between them, and an image stabilization drive mechanism that swings the movable body. The movable body often includes an annular barrel holder that surrounds the camera module around the optical axis. The support mechanism often includes a supported surface provided on the outer peripheral surface of the barrel holder, and a plurality of balls that are rollably held by the fixing body and in contact with the supported surface. The supported surface may be part of a spherical surface centered on the swing center point of the movable body.

In a configuration in which the support mechanism for supporting the movable body includes a plurality of balls that roll between the fixing body and the movable body, there is a problem that it is not easy to handle the plurality of balls when manufacturing the device.

SUMMARY

The exemplary optical unit with an image stabilization function of the present disclosure includes a movable body having a camera module and a frame-shaped holder that surrounds the camera module from an outer peripheral side, a swing support mechanism that swingably supports the movable body around a swing center point set in advance on an optical axis of the camera module inside the movable body, and a fixing body that supports the movable body with the swing support mechanism interposed between them. The holder includes three or more of a plurality of protrusions that project radially. The fixing body includes a plurality of arc surfaces that come into contact with each of the plurality of protrusions from the outer peripheral side. The swing support mechanism includes the plurality of protrusions and the plurality of arc surfaces. The arc surface is a concave curved surface obtained by transferring part of a virtual spherical surface centered on the swing center point.

The above and other elements, features, steps, characteristics and advantages of the present disclosure will become more apparent from the following detailed description of the preferred embodiments with reference to the attached drawings.

DETAILED DESCRIPTION

An embodiment of an optical unit with an image stabilization function to which the present disclosure is applied will be described below with reference to the drawings.

Figure 1:
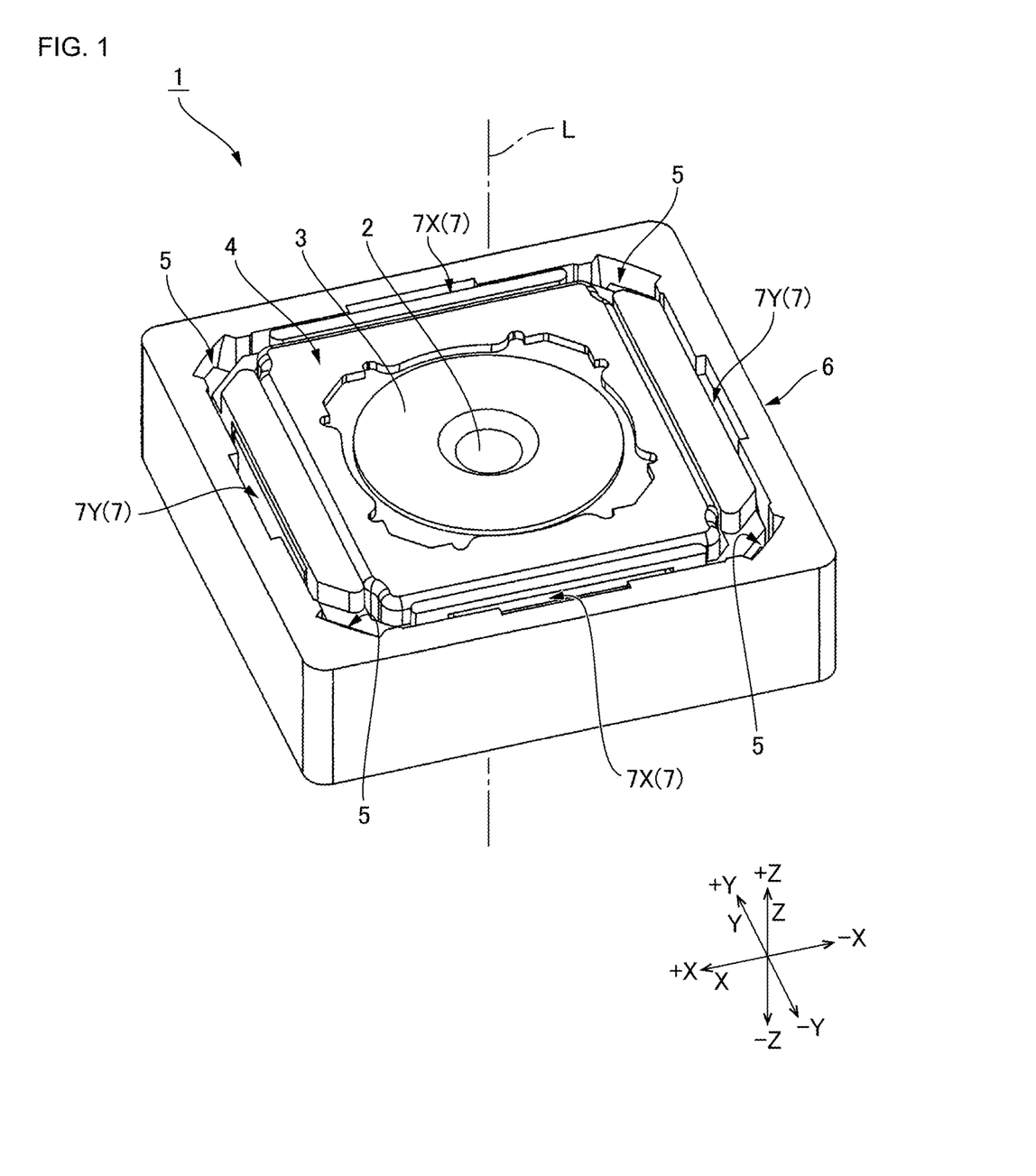
FIG. 1 is a perspective view of an optical unit with an image stabilization function.
Figure 2:
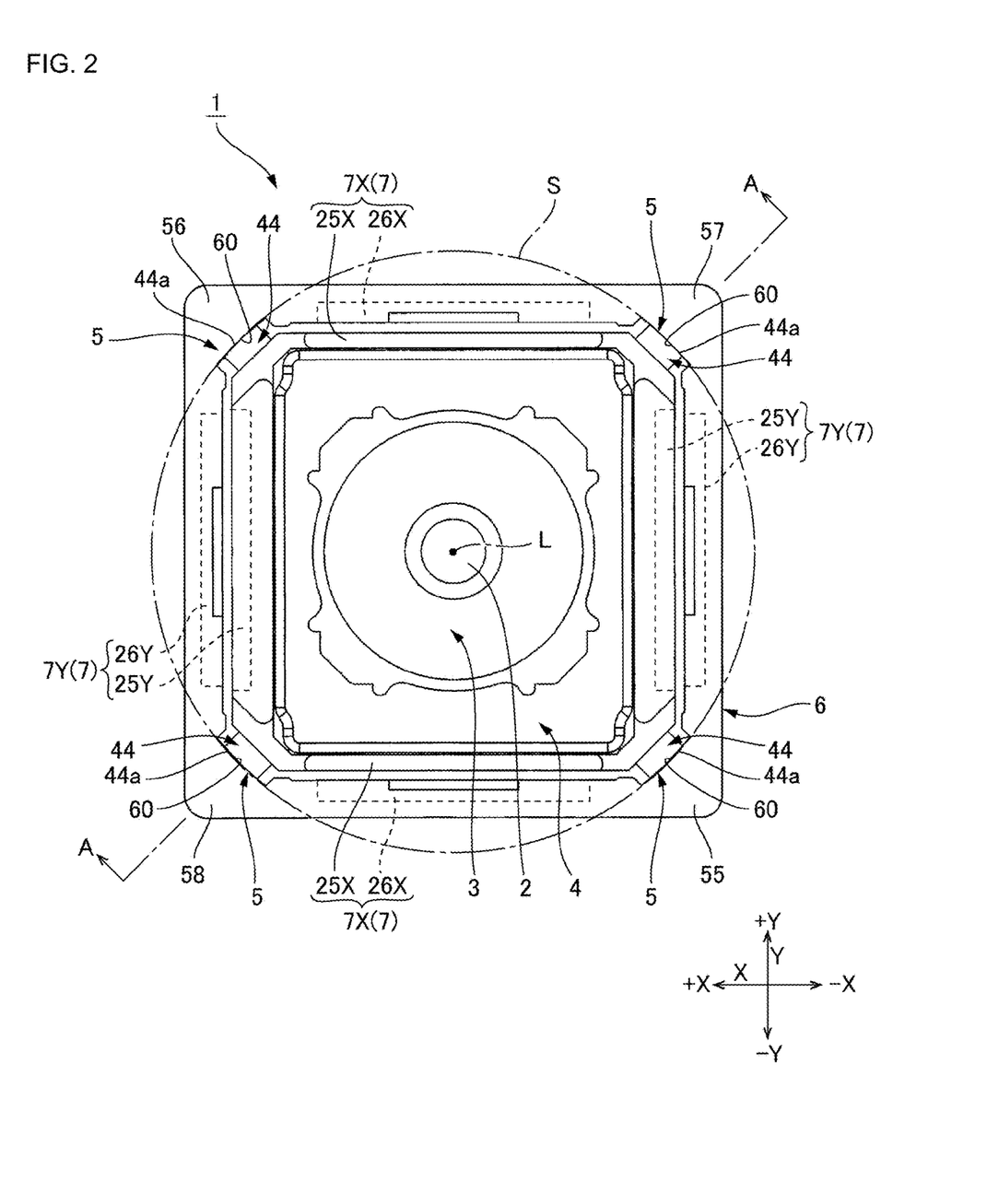
FIG. 2 is a plan view of the optical unit with an image stabilization function.
Figure 3:
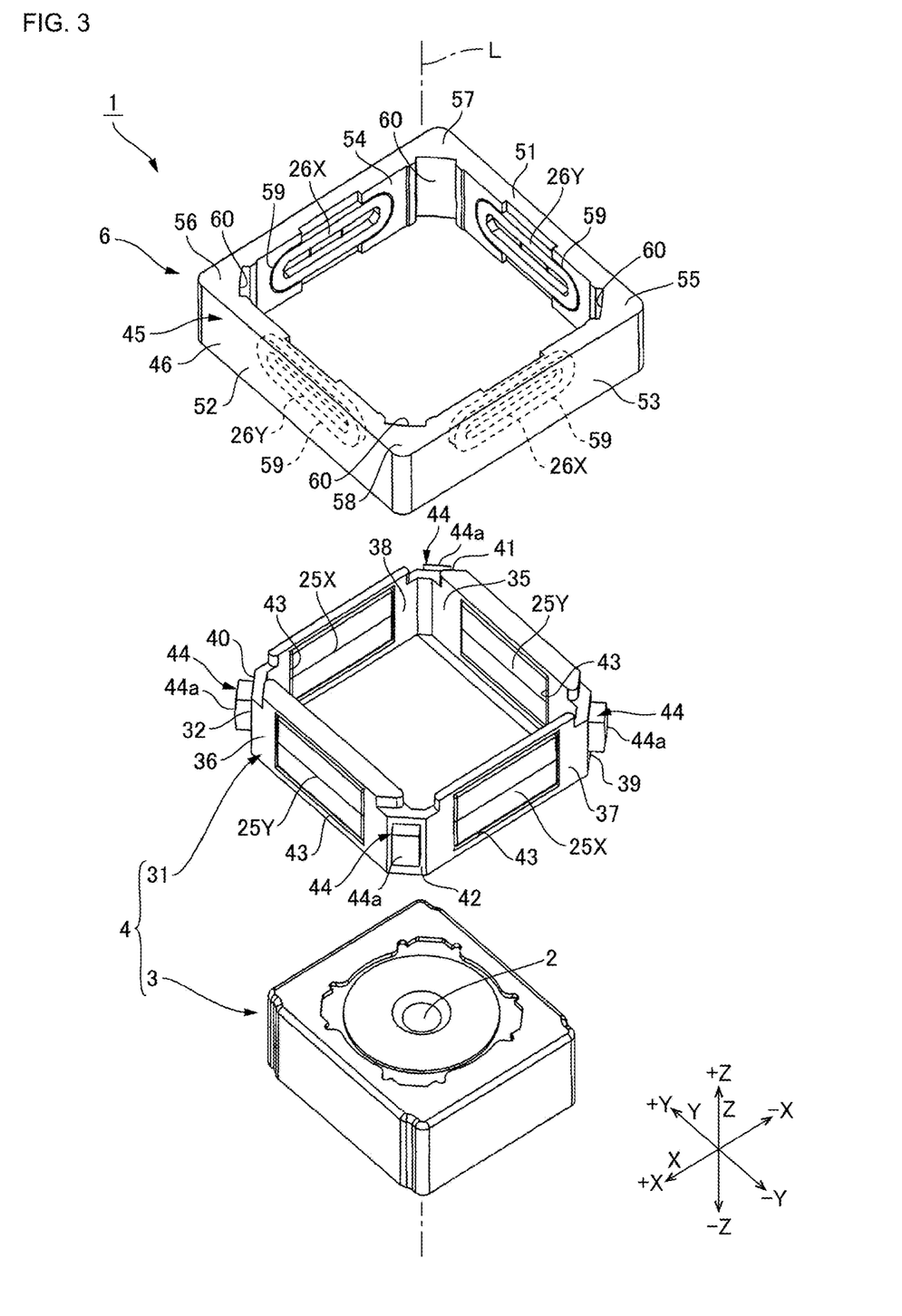
FIG. 3 is an exploded perspective view of the optical unit with an image stabilization function.
Figure 4:
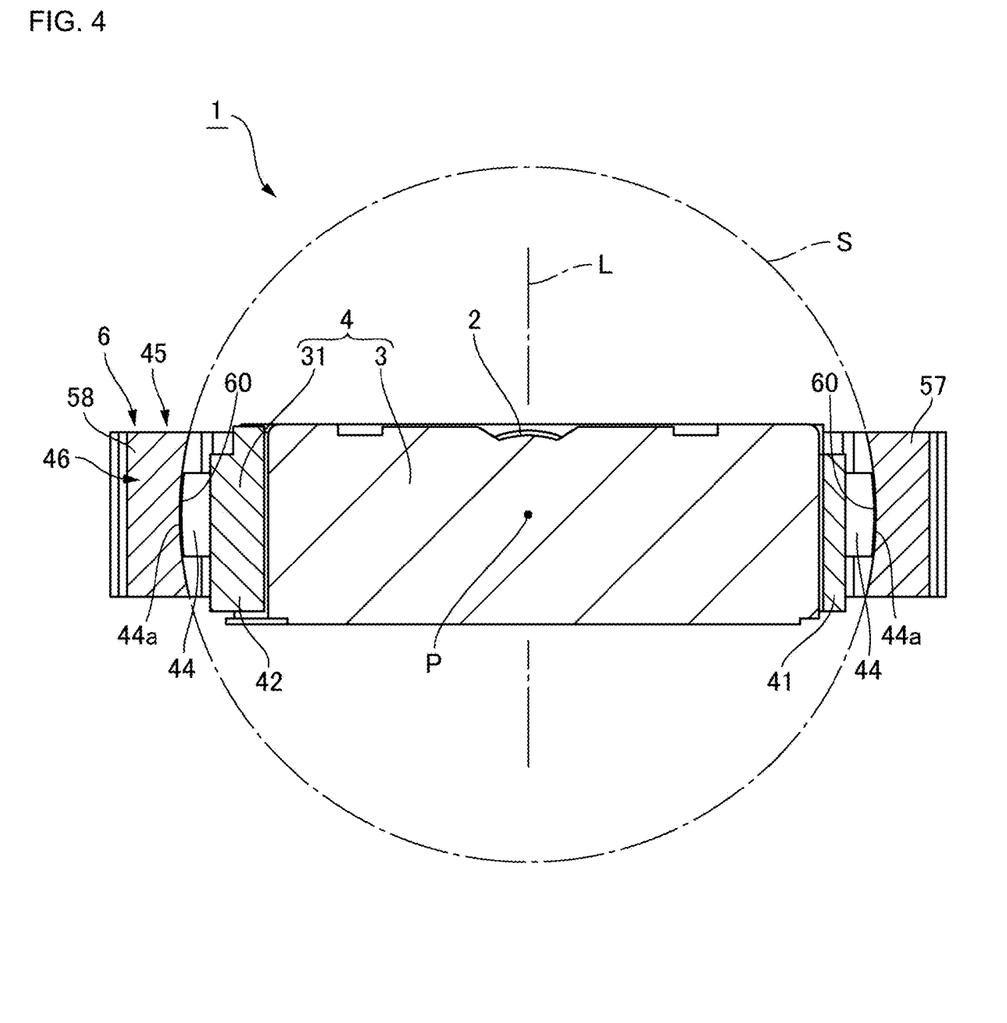
FIG. 4 is a sectional view taken along line A-A in FIG. 2.

FIG. 1 is a perspective view of an optical unit with an image stabilization function. FIG. 2 is a plan view of the optical unit with an image stabilization function when viewed from the subject side. FIG. 3 is an exploded perspective view of the optical unit with an image stabilization function. FIG. 4 is a sectional view taken along line A-A in FIG. 2. As shown in FIGS. 1 and 2, an optical unit 1 with an image stabilization function includes a camera module 3 provided with an optical element such as a lens 2. The optical unit 1 with an image stabilization function is mounted on, for example, a photographing device such as a mobile phone with a camera and a drive recorder, or an action camera or a wearable camera mounted on a moving body such as a helmet, a bicycle, or a radio-controlled helicopter. In these optical devices, if the optical device is tilted during shooting, the camera module 3 is tilted and the captured image is distorted. The optical unit 1 with an image stabilization function corrects the inclination of the camera module 3 based on an acceleration, an angular velocity, an amount of shake, and the like detected by a detection means such as a gyroscope in order to avoid distortion of the captured image.

In the description below, three axes orthogonal to each other will be an X-axis, a Y-axis, and a Z-axis. Further, the direction along the X-axis is an X-axis direction, one side of the X-axis direction is a −X direction, and the other side is a +X direction. The direction along the Y-axis is a Y-axis direction, one side of the Y-axis direction is a −Y direction, and the other side is a +Y direction. The direction along the Z-axis is a Z-axis direction, one side of the Z-axis direction is a −Z direction, and the other side is a +Z direction. The Z-axis direction is an optical axis L direction along an optical axis L of the camera module 3. The −Z direction is one side of the optical axis L direction and is a first direction. The +Z direction is the other side of the optical axis L direction and is a second direction. Further, the −Z direction (first direction) is on the image side of the camera module 3, and the +Z direction is on the subject side of the camera module 3. The −Z direction is on the side opposite to the subject of the camera module 3. A flexible printed circuit board (not shown) is pulled out from an end portion in the −Z direction of the camera module 3.

As shown in FIG. 1, the optical unit 1 with an image stabilization function includes a movable body 4 provided with the camera module 3, a swing support mechanism 5 that supports the movable body 4 in a manner the movable body 4 is swingable around a predetermined swing center point P, and a fixing body 6 that supports the movable body 4 with the swing support mechanism 5 interposed between them. Further, the optical unit 1 with an image stabilization function includes an image stabilization magnetic drive mechanism 7 that swings the movable body 4 with respect to the fixing body 6. The swing center point P around which the swing support mechanism 5 swingably supports the movable body 4 is set in advance on the optical axis L of the camera module 3. As shown in FIG. 4, the swing center point P is located inside the camera module 3.

The optical unit 1 with an image stabilization function performs image stabilization by swinging the movable body 4 around two axes that intersect the optical axis L of the camera module 3 and intersect each other. In the present embodiment, the optical unit 1 with an image stabilization function performs image stabilization by swinging the movable body 4 around the X-axis and the Y-axis that intersect the optical axis L of the camera module 3 and intersect each other. That is, the optical unit 1 with an image stabilization function performs image stabilization around the X-axis and image stabilization around the Y-axis to perform image stabilization in the pitching direction and image stabilization in the yawing direction.

As shown in FIG. 2, the image stabilization magnetic drive mechanism 7 includes a first image stabilization magnetic drive mechanism 7X that generates a driving force for rotating the movable body 4 around the X-axis, and a second image stabilization magnetic drive mechanism 7Y that generates a driving force for rotating the movable body 4 around the Y-axis. The first image stabilization magnetic drive mechanism 7X is disposed on both sides in the Y-axis direction of the movable body 4. The second image stabilization magnetic drive mechanism 7Y is disposed on both sides in the X-axis direction of the movable body 4. As shown in FIG. 3, the first image stabilization magnetic drive mechanism 7X includes two sets of a first magnet 25X (image stabilization magnet) and a first coil 26X (image stabilization coil). The second image stabilization magnetic drive mechanism 7Y includes two sets of a second magnet 25Y (image stabilization magnet) and a second coil 26Y (image stabilization coil). The first magnet 25X and the first coil 26X of the first image stabilization magnetic drive mechanism 7X face each other in the Y-axis direction. The second magnet 25Y and the second coil 26Y of the second image stabilization magnetic drive mechanism 7Y face each other in the X-axis direction. In the present embodiment, the first magnet 25X and the second magnet 25Y are disposed on the movable body 4, and the first coil 26X and the second coil 26Y are disposed on the fixing body 6. Note that the first magnet 25X and the second magnet 25Y can be disposed on the fixing body 6, and the first coil 26X and the second coil 26Y can be disposed on the movable body 4.

As shown in FIG. 3, the movable body 4 includes the camera module 3 and a frame-shaped holder 31 that surrounds the camera module 3. The camera module 3 has a rectangular parallelepiped shape as a whole. The camera module 3 includes the lens 2 and an image sensor (not shown). The holder 31 is made from resin. The holder 31 includes a holder-side frame plate portion 32 that surrounds the camera module 3 from the outer peripheral side.

The holder-side frame plate portion 32 is a plate-shaped frame body whose thickness direction is in the radial direction. As shown in FIG. 3, the holder-side frame plate portion 32 includes a holder-side first frame plate portion 35 extending in the Y-axis direction along the side surface of the camera module 3 in the −X direction of the camera module 3, and a holder-side second frame plate portion 36 extending in the Y-axis direction along the side surface of the camera module 3 in the +X direction of the camera module 3. Further, the holder-side frame plate portion 32 includes a holder-side third frame plate portion 37 extending in the X-axis direction along the side surface of the camera module 3 in the −Y direction of the camera module 3, and a holder-side fourth frame plate portion 38 extending in the X-axis direction along the side surface of the camera module 3 in the +Y direction of the camera module 3.

Further, the holder-side frame plate portion 32 includes a holder-side fifth frame plate portion 39 that connects the holder-side first frame plate portion 35 and the holder-side third frame plate portion 37 and a holder-side sixth frame plate portion 40 that connects the holder-side second frame plate portion 36 and the holder-side fourth frame plate portion 38 at a diagonal position in a first axis R1 direction of the holder-side fifth frame plate portion 39. The holder-side fifth frame plate portion 39 and the holder-side sixth frame plate portion 40 extend in parallel. Further, the holder-side frame plate portion 32 includes a holder-side seventh frame plate portion 41 that connects the holder-side first frame plate portion 35 and the holder-side fourth frame plate portion 38 and a holder-side eighth frame plate portion 42 that connects the holder-side fourth frame plate portion 38 and the holder-side second frame plate portion 36 at a diagonal position in a second axis R2 direction with respect to the holder-side seventh frame plate portion 41. The holder-side seventh frame plate portion 41 and the holder-side eighth frame plate portion 42 extend in parallel.

Each of the holder-side first frame plate portion 35, the holder-side second frame plate portion 36, the holder-side third frame plate portion 37, and the holder-side fourth frame plate portion 38 is provided with a magnet holding hole 43 penetrating in the radial direction. The second magnet 25Y of the second image stabilization magnetic drive mechanism 7Y is inserted into and fixed to the magnet holding hole 43 of the holder-side first frame plate portion 35 and the magnet holding hole 43 of the holder-side second frame plate portion 36. The first magnet 25X fixed to the magnet holding hole 43 of the holder-side third frame plate portion 37 and the magnet holding hole 43 of the holder-side fourth frame plate portion 38. The first magnet 25X and the second magnet 25Y are magnetized so that the magnetic poles of surfaces facing outward in the radial direction are different between both sides of a magnetization polarization line extending in the circumferential direction in the center in the Z-axis direction as a boundary.

Here, an outer end face of the holder-side fifth frame plate portion 39, an outer end face of the holder-side sixth frame plate portion 40, an outer end face of the holder-side seventh frame plate portion 41, and an outer end face of the holder-side eighth frame plate portion 42 are provided with a protrusion 44 that projects outward in the radial direction. Each of the four protrusions 44 extends in a direction orthogonal to the optical axis L. The planar shape of each of the protrusions 44 when viewed from the outside in the radial direction is a rectangle whose Z-axis direction is longer than the circumferential direction. A tip surface 44a of each of the protrusions 44 is an arc surface projecting to the outer peripheral side. As shown in FIGS. 2 and 4, the tip surface 44a of each of the protrusions 44 is composed of part of a virtual spherical surface S centered on the swing center point P of the movable body 4.

As shown in FIG. 3, the fixing body 6 includes a frame-shaped case 45. The case 45 is made from resin. The case 45 includes a fixing body side frame plate portion 46 that surrounds the holder 31 from the outside in the radial direction.

The fixing body side frame plate portion 46 is a fixing body side first frame plate portion 51 extending in the Y-axis direction in the −X direction of the movable body 4, a fixing body side second frame plate portion 52 extending in the Y-axis direction in the +X direction of the movable body 4, a fixing body side third frame plate portion 53 extending in the X-axis direction in the −Y direction of the movable body 4, and a fixing body side fourth frame plate portion 54 extending in the X-axis direction in the +Y direction of the movable body 4. In the fixing body side frame plate portion 46, the corner portion between the fixing body side first frame plate portion 51 and the fixing body side third frame plate portion 53 is connected by a fixing body side fifth frame plate portion 55. The corner portion between the fixing body side second frame plate portion 52 and the fixing body side fourth frame plate portion 54 is connected by a fixing body side sixth frame plate portion 56. The corner portion between the fixing body side first frame plate portion 51 and the fixing body side fourth frame plate portion 54 is connected by a fixing body side seventh frame plate portion 57. The corner portion between the fixing body side second frame plate portion 52 and the fixing body side third frame plate portion 53 is connected by a fixing body side eighth frame plate portion 58.

Each of the radial inner surface of the fixing body side first frame plate portion 51, the radial inner surface of the fixing body side second frame plate portion 52, the radial inner surface of the fixing body side third frame plate portion 53, and the radial inner surface of the fixing body side fourth frame plate portion 54 is provided with a coil holding hole 59. The second coil 26Y of the second image stabilization magnetic drive mechanism 7Y is fixed to each of the coil holding hole 59 of the fixing body side first frame plate portion 51 and the coil holding hole 59 of the fixing body side second frame plate portion 52. The first coil 26X of the first image stabilization magnetic drive mechanism 7X is fixed to each of the coil holding hole 59 of the fixing body side third frame plate portion 53 and the coil holding hole 59 of the fixing body side fourth frame plate portion 54. The first coil 26X and the second coil 26Y are air-core coils, and two long sides located on the +Z direction side and the −Z direction side are used as effective sides.

Each of the fixing body side fifth frame plate portion 55, the fixing body side sixth frame plate portion 56, the fixing body side seventh frame plate portion 57, and the fixing body side eighth frame plate portion 58 has an arc surface 60 facing inward in the radial direction. As shown in FIGS. 2 and 4, each of the arc surfaces 60 is a concave curved surface obtained by transferring part of the virtual spherical surface S centered on the swing center point P. A central portion in the circumferential direction of each of the arc surfaces 60 is recessed toward the outer peripheral side. A central portion in the optical axis L direction of each of the arc surfaces 60 is recessed toward the outer peripheral side.

As shown in FIGS. 2 and 4, when the optical unit 1 with the image stabilization function is assembled, the movable body 4 is disposed inside the fixing body. When the movable body 4 is disposed inside the fixing body, the tip surface 44a of each of the protrusions 44 of the holder of the movable body 4 and each of the arc surfaces 60 of the case 45 of the fixing body 6 face each other, and in contact with each other on a surface so as to be slidable. In this manner, the movable body 4 is supported by the swing support mechanism 5 in a state where the movable body 4 can swing around the swing center point P. That is, the movable body 4 has the tip surface 44a of each of the protrusions 44 guided along each of the arc surfaces 60 so as to swing around the swing center point P.

In the present embodiment, the swing support mechanism 5 that supports the movable body 4 so that the movable body 4 can swing around the preset swing center point P has the arc surface 60 that is in contact with the movable body 4 from the outer peripheral side. That is, the movable body 4 is swingably supported by the arc surface 60 provided on the fixing body 6. Therefore, it is not necessary for the swing support mechanism 5 to have a plurality of balls that can be rolled. Further, the holder of the movable body 4 is provided with three or more of the protrusions 44 that project radially, and the tip of each of the protrusions 44 comes into contact with the arc surface 60. Therefore, the contact area between the holder 31 of the movable body 4 and the arc surface 60 of the fixing body 6 can be reduced as compared with the case where the entire outer peripheral surface of the holder 31 of the movable body 4 is supported by the arc surface 60. In this manner, the sliding resistance between the holder 31 and the arc surface 60 can be reduced, so that the movable body 4 can be swingably supported by the swing support mechanism 5.

Further, each of the plurality of protrusions 44 extends in the radial direction orthogonal to the optical axis L. The fixing body 6 includes the frame-shaped case 45 that surrounds the movable body 4 from the outside in the radial direction. A plurality of the arc surfaces 60 are provided on the radial inner surface of the case 45. Therefore, by providing the swing support mechanism 5, it is possible to prevent the movable body 4 and the fixing body 6 from becoming large in the optical axis L direction.

Furthermore, the swing support mechanism 5 includes four of the protrusions 44. Therefore, it is easy to reduce the sliding resistance between the holder 31 and the arc surface 60.

Further, the tip surface 44a of each of the protrusions 44 is in contact with each of the arc surfaces 60 on a surface so as to be slidable. Therefore, it is easy to prevent the movable body 4 from becoming unstable during swinging.

Furthermore, the present embodiment has the image stabilization magnetic drive mechanism 7 that causes the movable body 4 to swing in a direction intersecting the optical axis L, and the image stabilization magnetic drive mechanism 7 includes the first magnet 25X and the second magnet 25Y fixed to the holder 31, and the first coil 26X and the second coil 26Y fixed to the case 45. Therefore, the movable body 4 can be caused to swing around the swing center point P.

In the above example, the shape of the tip surface 44a when each of the protrusions 44 is viewed from the outside in the radial direction is rectangular. However, the shape may be circular. In such a case as well, the tip surface 44a is composed of part of a virtual spherical surface S centered on the swing center point P of the movable body 4.

Here, the tip surface 44a of each of the protrusions 44 or each of the arc surfaces 60 may have irregularities. In this case, it can be assumed that grease is applied between the tip surface 44a of each of the protrusions 44 and each of the arc surfaces 60. In this way, grease can be held on the tip surface 44a of each of the protrusions 44 or each of the arc surfaces 60. Further, the grease can further reduce the sliding resistance between the holder 31 and the arc surface 60.

Further, the tip surface 44a of each of the protrusions 44 may be provided with a coating layer having a hardness higher than that of each of the protrusions 44. In this way, it is possible to prevent the tip surface 44a of the protrusion 44 from being worn due to the sliding of the protrusion 44 and the arc surface 60.

Figure 5:
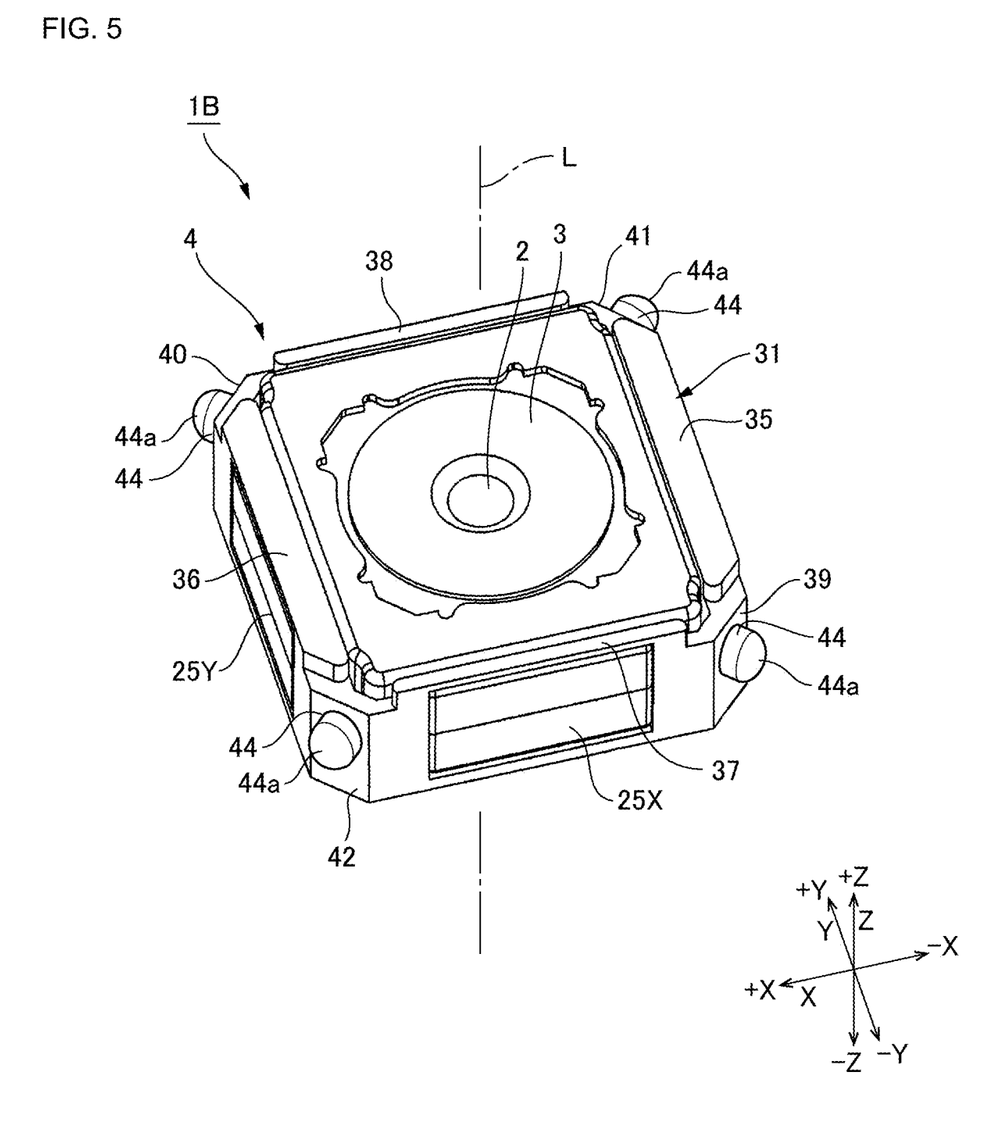
FIG. 5 is an explanatory view of the optical unit with an image stabilization function of a first modification.

Further, the tip surface 44a of each of the protrusions 44 can be in contact with each of the arc surfaces 60 at a point so as to be slidable. In this case, for example, the tip of each of the protrusions 44 has a hemispherical shape. FIG. 5 is an explanatory view of the optical unit with an image stabilization function of a first modification. In FIG. 5, the movable body 4 of an optical unit 1B with an image stabilization function of the first modification is taken out and shown. Note that the optical unit 1B with an image stabilization function of the present modification has the same configuration as the optical unit 1 with an image stabilization function mentioned above except for the shape of the tip of each of the protrusions 44. In this manner, the sliding resistance between the holder 31 and the arc surface 60 can be further reduced.

Figure 6:
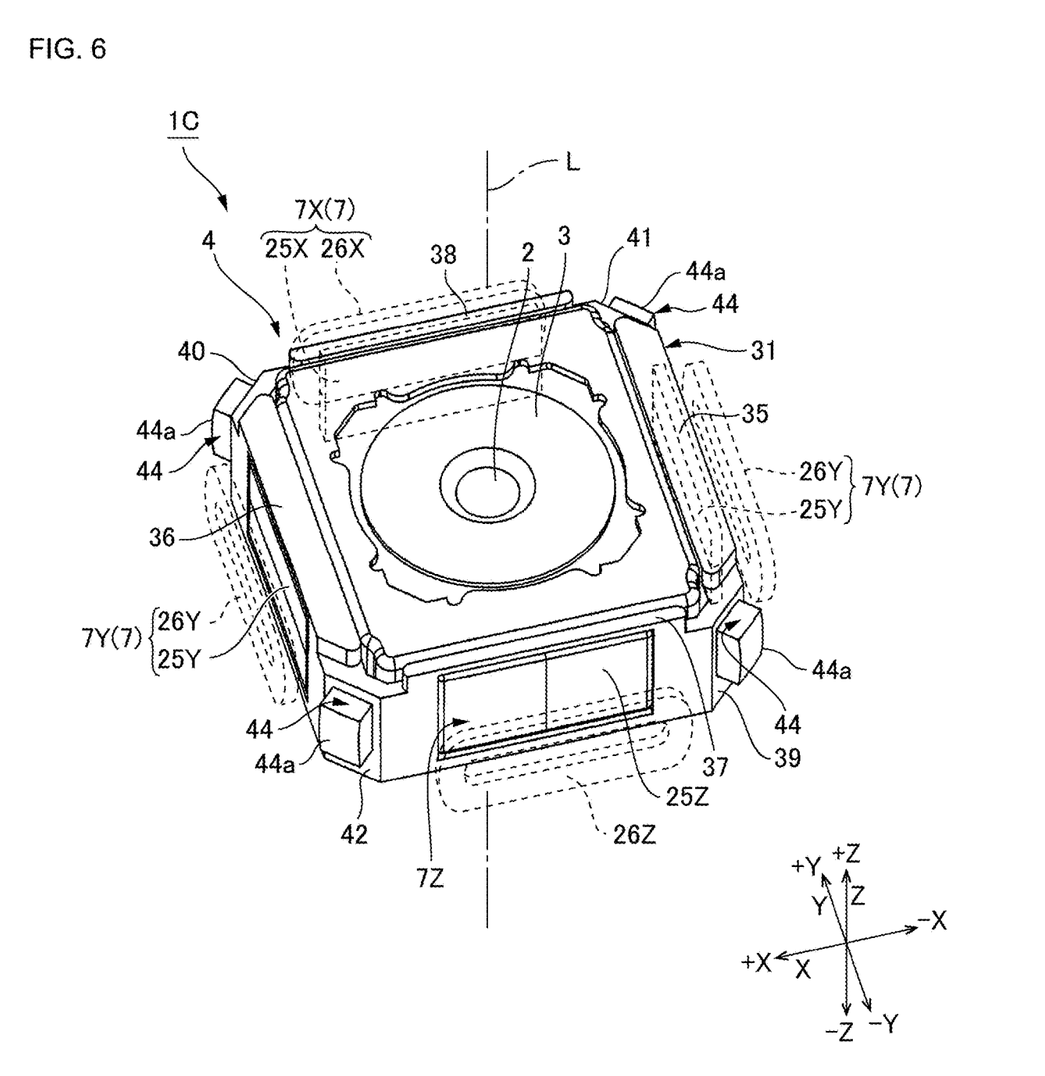
FIG. 6 is an explanatory view of the optical unit with an image stabilization function of a second modification.

Furthermore, the optical unit 1 with an image stabilization function may have a rolling correction magnetic drive mechanism that causes the movable body 4 to swing around the optical axis L. FIG. 6 is an explanatory view of the optical unit with an image stabilization function of a second modification. In FIG. 6, the movable body 4 of an optical unit 1C with an image stabilization function of the second modification is taken out and shown. Note that the optical unit 1C with an image stabilization function of the present modification has the same configuration as the optical unit 1 with an image stabilization function mentioned above except that a rolling correction magnetic drive mechanism 7Z is included.

In the example shown in FIG. 6, the rolling correction magnetic drive mechanism 7Z includes a rolling correction magnet 25Z fixed to the holder 31 and a rolling correction coil 26Z fixed to the case 45 and facing the rolling correction magnet 25Z. More specifically, the first magnet 25X fixed to the holder-side third frame plate portion 37 is referred to as the rolling correction magnet 25Z. Further, the first coil 26X fixed to the fixing body side third frame plate portion 53 of the fixing body 6 is referred to as the rolling correction coil 26Z. The rolling correction magnet 25Z is magnetized so that the magnetic poles of surfaces facing outward in the radial direction are different between both sides of a magnetization polarization line extending in the Z-axis direction in the center in the circumferential direction as a boundary. Further, the rolling correction coil 26Z uses two sides located on one side and the other side in the circumferential direction as effective sides. In this way, the movable body 4 can be caused to swing around the optical axis L.

Note that the second image stabilization magnetic drive mechanism 7Y may have only one set of the second magnet 25Y (image stabilization magnet) and the second coil 26Y (image stabilization coil). Further, the rolling correction magnet 25Z may be fixed to the case 45, and the rolling correction coil 26 may be fixed to the holder 31. Furthermore, one of two sets of the first magnet 25X and the first coil 26X arranged in the X-axis direction may be used as the rolling correction magnet 25Z and the rolling correction coil 26Z.

Figure 7:
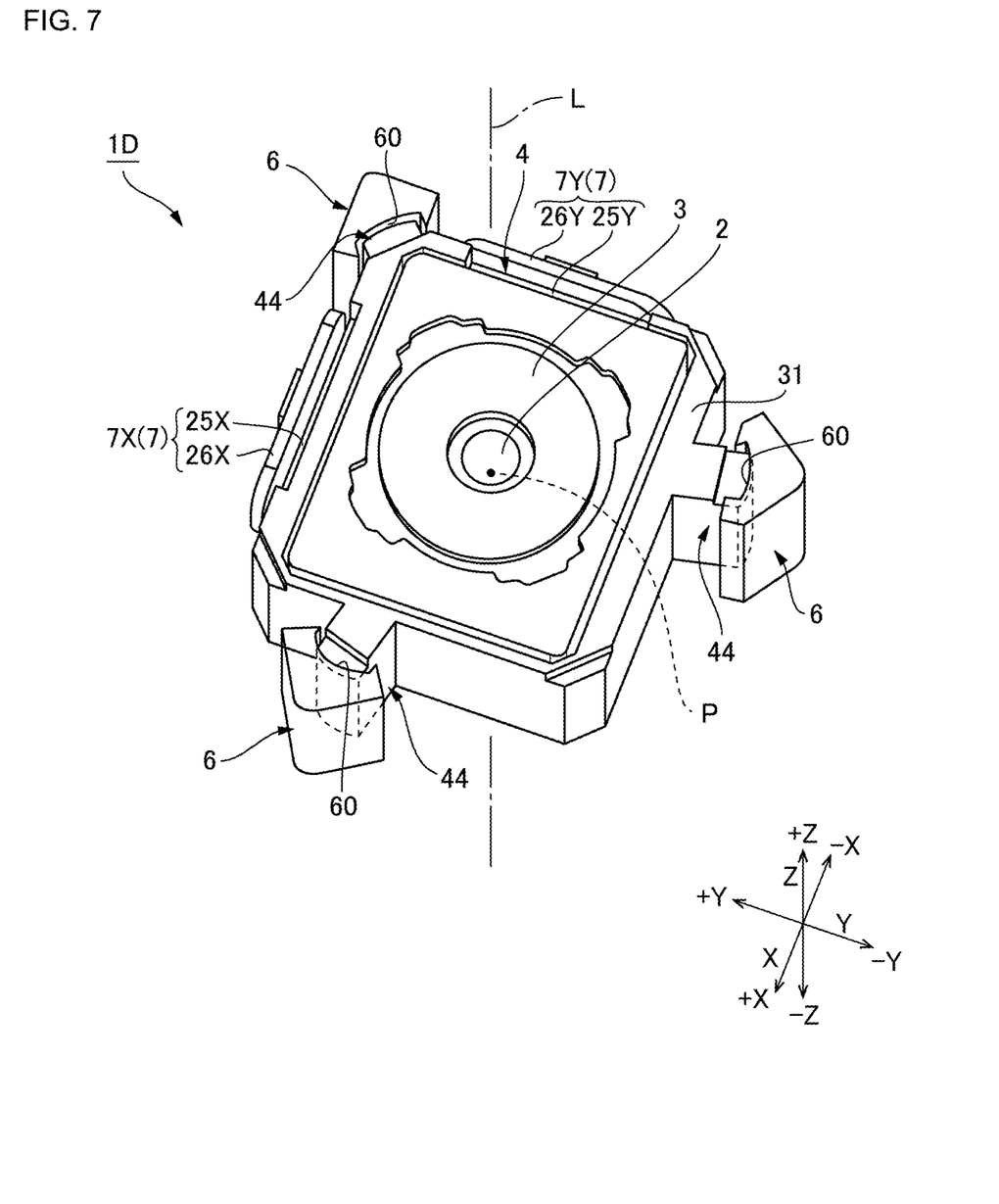
FIG. 7 is an explanatory view of the optical unit with an image stabilization function of a third modification.

Further, in the optical unit 1 with an image stabilization function, the number of the protrusions 44 protruding from the movable body 4 can be increased or decreased as long as the number is three or more. FIG. 7 is an explanatory view of the optical unit with an image stabilization function of a third modification. In FIG. 7, the movable body 4 and a coil of the image stabilization magnetic drive mechanism 7 of an optical unit 1D with an image stabilization function of the third modification are taken out and shown. Further, in FIG. 7, the fixing body 6 is partially shown. In the optical unit 1D with an image stabilization function of the present modification, three of the protrusions 44 radially project from the movable body 4. Further, the fixing body 6 includes three of the arc surfaces 60 with which each of the protrusions 44 comes into contact so as to be slidable. Here, if the number of the protrusions 44 is three, the sliding resistance between the holder 31 and the arc surface 60 can be further reduced.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An optical unit with an image stabilization function, the optical unit comprising:
    a movable body having
        a camera module, and
        a frame-shaped holder that surrounds the camera module from an outer peripheral side of the camera module;
    a swing support mechanism that swingably supports the movable body around a swing center point set in advance on an optical axis of the camera module inside the movable body; and
    a fixing body that supports the movable body with the swing support mechanism interposed therebetween, wherein
    the frame-shaped holder includes three or more of a plurality of protrusions that project radially,
    the fixing body includes a plurality of arc surfaces that come into contact with the plurality of protrusions, respectively, from an outer peripheral side of the movable body,
    along the optical axis of the camera module, the plurality of protrusions are smaller than the plurality of arc surfaces, respectively,
    the plurality of protrusions and the plurality of arc surfaces are symmetrical with respect to a plane orthogonal to the optical axis,
    the swing support mechanism includes the plurality of protrusions and the plurality of arc surfaces, and
    each arc surface of the plurality of arc surfaces is a concave curved surface being a portion of a spherical surface centered on the swing center point.

2. The optical unit according to claim 1, wherein
    each of the plurality of protrusions extends in a direction orthogonal to the optical axis, and the fixing body includes a frame-shaped case that surrounds the movable body from a radial outside, and
    the plurality of arc surfaces are provided on a radial inner surface of the fixing body.

3. The optical unit according to claim 2, wherein the swing support mechanism includes three or four protrusions.

4. The optical unit according to claim 1, further comprising:

an image stabilization magnetic drive mechanism configured to cause the movable body to swing around an axis intersecting the optical axis, wherein the image stabilization magnetic drive mechanism includes
an image stabilization magnet fixed to one of the frame-shaped holder and the fixing body, and
an image stabilization coil that is fixed to the other of the frame-shaped holder and the fixing body and faces the image stabilization magnet.

5. The optical unit according to claim 1, further comprising:
a rolling correction magnetic drive mechanism configured to cause the movable body to swing around the optical axis, wherein the rolling correction magnetic drive mechanism includes
a rolling correction magnet fixed to one of the frame-shaped holder and the fixing body, and
a rolling correction coil that is fixed to the other of the frame-shaped holder and the fixing body and faces the rolling correction magnet.

6. The optical unit according to claim 1, wherein
a tip surface of each protrusion of the plurality of protrusions is in slidable contact with a respective arc surface of the plurality of arc surfaces at a point.

7. The optical unit according to claim 1, wherein
a tip surface of each protrusion of the plurality of protrusions is in slidable contact with a respective arc surface of the plurality of arc surfaces on a surface.

8. The optical unit according to claim 7, wherein
the tip surface of said each protrusion or the respective arc surface has irregularities, and
the optical unit further comprises grease between the tip surface of said each protrusion and the respective arc surface.

9. The optical unit according to claim 7, further comprising a coating layer having a hardness higher than that of said each protrusion and provided on the tip surface of said each protrusion.

* * * * *